US009450929B2

(12) United States Patent
Tanizawa et al.

(10) Patent No.: US 9,450,929 B2
(45) Date of Patent: Sep. 20, 2016

(54) COMMUNICATION DEVICE, COMMUNICATION SYSTEM, AND COMPUTER PROGRAM PRODUCT

(71) Applicant: Kabushiki Kaisha Toshiba, Minato-ku (JP)

(72) Inventors: Yoshimichi Tanizawa, Yokohama (JP); Hideaki Sato, Yokohama (JP); Ririka Takahashi, Setagaya-ku (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 318 days.

(21) Appl. No.: 14/082,338

(22) Filed: Nov. 18, 2013

(65) Prior Publication Data

US 2014/0143867 A1 May 22, 2014

(30) Foreign Application Priority Data

Nov. 19, 2012 (JP) ................ 2012-253244

(51) Int. Cl.
*H04L 9/08* (2006.01)
*H04L 29/06* (2006.01)
*H04L 9/00* (2006.01)

(52) U.S. Cl.
CPC ............. *H04L 63/065* (2013.01); *H04L 9/002* (2013.01); *H04L 9/0855* (2013.01); *H04L 9/0891* (2013.01); *H04L 63/1416* (2013.01); *H04L 63/1466* (2013.01)

(58) Field of Classification Search
CPC ............. H04L 63/12; H04L 63/1441–63/145; H04L 9/0891

USPC .......................................................... 726/22
See application file for complete search history.

(56) References Cited

U.S. PATENT DOCUMENTS

2010/0329463 A1* 12/2010 Ratliff .................. H04L 9/0833
                                                        380/279
2011/0078497 A1*  3/2011 Lyne .................... G06F 11/1469
                                                         714/15

FOREIGN PATENT DOCUMENTS

JP          2008-154019          7/2008

OTHER PUBLICATIONS

Christian Kollmitzer et al. "Applied Quantum Cryptography", Lecture Notes in Physics 797, 2010, 22 pages.
Mehrdad Dianati et al. "Architecture and protocols of the future European quantum key distribution network", Security and Communication Networks, 2008, 18 pages.

* cited by examiner

*Primary Examiner* — Brian Shaw
(74) *Attorney, Agent, or Firm* — Oblon, McClelland, Maier & Neustadt, L.L.P.

(57) ABSTRACT

According to an embodiment, a communication device is connected to a plurality of external devices which share key information with each other. The communication device includes a detector and an instructing unit. The detector is configured to, from among the external devices, detect an external device that has been subject to attack. The instructing unit is configured to issue an instruction to stop using key information which is shared with the detected external device.

13 Claims, 6 Drawing Sheets

COMMUNICATION DEVICE, COMMUNICATION SYSTEM, AND COMPUTER PROGRAM PRODUCT

CROSS-REFERENCE TO RELATED APPLICATIONS

This application is based upon and claims the benefit of priority from Japanese Patent Application No. 2012-253244, filed on Nov. 19, 2012; the entire contents of which are incorporated herein by reference.

FIELD

Embodiments described herein relate generally to a communication device, a communication system, and a computer program product.

BACKGROUND

In a key generating and sharing system, two networks (namely, a key sharing network and an application network) are present. The key sharing network is configured with a plurality of networked nodes which is mutually connected by a plurality of links. Each node has the function of generating and sharing a random number with opposite nodes that are connected by links, as well as has the function of performing cryptographic communication over a link by using a random number as a cryptographic key (hereinafter, referred to as "a link key"). Moreover, some of the nodes also have the function of generating a cryptographic key (hereinafter, referred to as "an application key"), which is a random number, independent of the links; as well as have the function of transmitting the application key to a different node via a link.

An application has the function of obtaining an application key from a node; using that application key as a cryptographic key; and performing cryptographic communication with another application. At that time, the cryptographic data communication can be performed using a network (an application network), such as the Internet, that is different than the key sharing network. Meanwhile, applications and nodes can be configured in an integrated manner. Alternatively, applications and nodes can be configured as terminals independent of each other, and application keys can be transmitted and received among them.

In a node, the function of generating a random number (a link key) and sharing it with opposite nodes that are connected by links can also be implemented using, for example, a technology that is commonly called quantum cryptography or quantum key distribution (QKD).

The security of application key relay via internode links can be guaranteed if, for example, the quantum key distribution technology is implemented. However, at the same time, the security of the nodes themselves that transfer application keys needs to be enhanced by implementing some other method.

DETAILED DESCRIPTION

Figure 1:
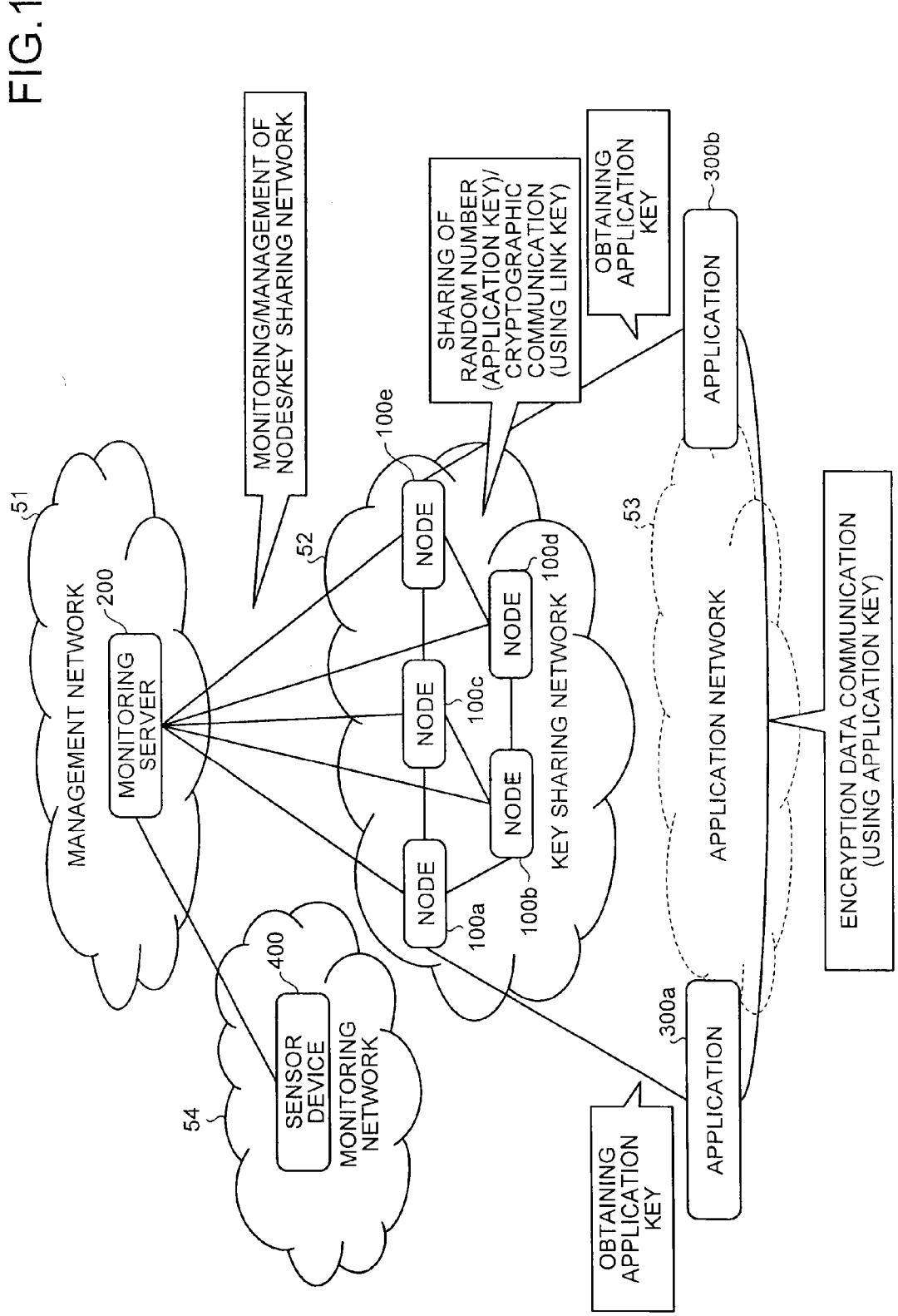
FIG. 1 is a configuration diagram of a communication system according to embodiments.

According to an embodiment, a communication device is connected to a plurality of external devices which share key information with each other. The communication device includes a detector and an instructing unit. The detector is configured to, from among the external devices, detect an external device that has been subject to attack. The instructing unit is configured to issue an instruction to stop using key information which is shared with the detected external device.

Various embodiments will be described below in detail with reference to the accompanying drawings.

First Embodiment

In a key sharing network, an application key that is required by an application to perform communication is transferred among the nodes in a relayed manner. With that, the internode sharing of the application key is performed in a secure manner. In the key sharing network, ensuring the security of application keys is important. As described above, the security of internode links can be guaranteed using the quantum key distribution technology.

However, there can occur a situation in which the computer of a node faces a hacking attack, and application keys that are transferred in a relayed manner or link keys that are used in encrypting application keys are stolen or tapped. Such an attack on the computer can be prevented using the computer network security technology that is already available. However, there exists no technology which can be regarded to be unconditionally secure. Moreover, there is also a possibility of a physical attack with respect to a node. For example, it is possible to think of an attack in which a memory device, which is used to temporarily hold the application keys transferred in a relayed manner by the node, or a memory and a disk device, which are used to hold the link keys to be shared among the nodes, are physically stolen.

In this way, there are times when a node that constitutes a key sharing network is subject to attack, and not only the soundness of the application key relay function implemented by the node is put to risk but also the security of the link keys shared by the node is put to risk. However, in such a case, there is no clarity about the manner in which the key generating and sharing system should operate so as to maintain the security and soundness of the system.

A communication system according to a first embodiment includes a monitoring server that monitors the status of a key sharing network. Herein, the monitoring server monitors the connection status of the nodes present in the key sharing network; monitors the sharing status of application keys; and monitors the sharing status of link keys. Moreover, if an attack on a node is detected, the monitoring server restructures the sharing route in such a way that application keys are shared while avoiding the node that has been attacked.

Furthermore, to the group of nodes which share application keys or link keys with the node that has been attacked, the monitoring server issues an instruction to destroy as well as not to use the shared keys. With that, in the key sharing network, even if a particular node is subject to attack, it becomes possible for the key sharing network to keep implementing the application key sharing function in a secure manner.

FIG. 1 is a diagram illustrating a configuration example of the communication system according to the embodiments. Herein, FIG. 1 illustrates an example of a case in which the nodes and the applications are configured independent of each other. The communication system includes nodes 100a to 100e, a monitoring server 200, and applications 300a and 300b.

When there is no need to distinguish between the nodes 100a to 100e, they are simply referred to as nodes 100. Similarly, when there is no need to distinguish between the applications 300a and 300b, they are simply referred to as applications 300. Meanwhile, the number of nodes 100 is not limited to five, and the number of applications 300 is not limited to two.

As described above, the nodes 100a to 100e have the function of generating and sharing random numbers with respective opposite nodes; as well as have the function of using the generated random numbers as link keys and transferring application keys, which are separately-generated random numbers, with repeated encryption and decryption over a key sharing network 52 for the purpose of sharing the application keys with respective opposite nodes. The applications 300a and 300b obtain application keys from the nodes 100 and perform cryptographic communication using the application keys over an application network 53.

In the first embodiment, in addition to the key sharing network 52 and the application network 53, two more networks (namely, a management network 51 and a monitoring network 54) are present. The monitoring server 200 is present in the management network 51. Moreover, the monitoring server 200 performs monitoring by gathering the status information of the nodes 100, gathering the status information of key sharing among the nodes 100, and gathering information related to the attacks on the nodes 100. Meanwhile, the monitoring server 200 is also connected to the monitoring network 54, to which is connected a sensor device 400 used in monitoring the physical security of the nodes 100 or the key sharing network 52.

The sensor device 400 is, for example, a monitoring camera, a vibration sensor, a door open/close sensor, and a fire sensor (a fire-alarm box); or a computer that includes such sensors. The sensor device 400 monitors the physical security of the nodes 100 (generally, the nodes 100 are installed in a server room or the like). In FIG. 1, only a single sensor device 400 is illustrated. However, it is also possible to have a plurality of sensor devices 400.

The network that connects the monitoring server 200 and the nodes 100 (i.e., the management network 51) as well as the monitoring network 54 is a commonplace data communication network. The monitoring server 200 can also be installed at a distant location from the key sharing network 52. Meanwhile, in order to enhance the security of these networks, it is possible to use an existing network security technology or to use the quantum cryptographic communication technology.

Given below is the explanation of an exemplary device configuration of each of the node 100, the application 300, the monitoring server 200, and the sensor device 400.

Figure 2:
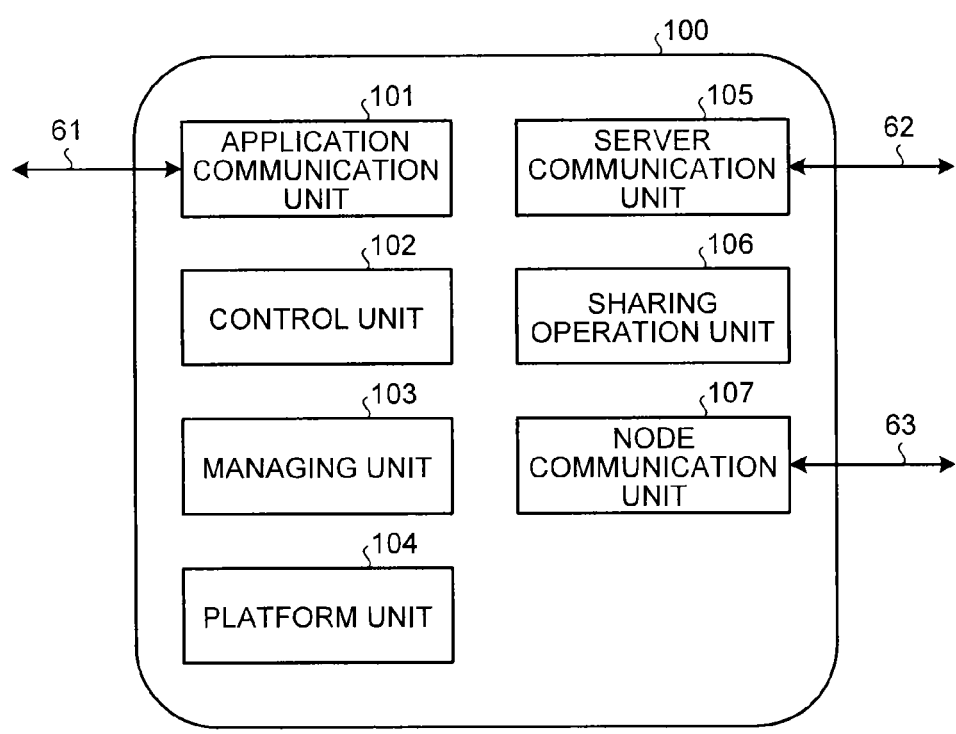
FIG. 2 is a block diagram illustrating a node according to a first embodiment.

FIG. 2 is a block diagram illustrating a configuration example of the node 100 according to the first embodiment. The node 100 includes a node communication unit 107, a sharing operation unit 106, a managing unit 103, an application communication unit 101, a control unit 102, a platform unit 104, and a server communication unit 105.

The node communication unit 107 implements the quantum cryptographic communication technology to generate a random number and share it with the node (opposite node) that is directly connected via an internode link 63, and manages the generated random number as a link key. Herein, the internode link 63 connects a plurality of nodes 100 within the key sharing network 52. The node communication unit 107 is used at the time of performing internode data communication with another node 100 that is connected via a link. Herein, the other node 100 either can be the opposite node connected directly by a link or can be another node 100 connected via a different internode link 63 of the opposite node. In the latter case, the node communication unit 107 can be equipped with a routing function for performing communication via a plurality of nodes 100 in the cryptographic communication network. The routing function can be implemented using an existing technology.

The data that is exchanged among the nodes 100 via the node communication unit 107 is, for example, the data of application keys. Such data can be exchanged in the form of encrypted communication that is encrypted using the link keys managed by the nodes 100. Meanwhile, in FIG. 2, only a single node communication unit 107 is illustrated. However, it is also possible to connect a plurality of nodes 100 via a plurality of internode links 63. Moreover, the link keys can be held in the managing unit 103.

The sharing operation unit 106 performs a sharing operation in which an application key is generated in the form of a random number and is shared with another node 100. Herein, the application key is generated in the form of a random number that has an ID (identification information) of the application key appended thereto. The format of the IDs of application keys is not particularly specified. For example, it is assumed that the order of application keys according to consecutive numbers. Then, the generated application key is held in the managing unit 103. According to an instruction from the control unit 102, the sharing operation unit 106 can share the generated application key. For that, the sharing operation unit 106 encrypts the application key using the node communication unit 107 and then sends the encrypted application key to another node 100. On the other hand, the sharing operation unit 106 obtains an application key that has been received from another node 100 via the node communication unit 107, and stores that application key in the managing unit 103.

The managing unit 103 holds and manages application keys. An application key held in the managing unit 103 is either an application key generated by the sharing operation unit 106 or an application key received from another node 100 via the node communication unit 107. The application keys held in the managing unit 103 represent one of the most important set of data from the security perspective in the cryptographic communication system. For that reason, the file system or the operating system (OS) can be used to implement security measures such as encryption, tampering prevention, and access control. Although the managing unit 103 can be implemented in various ways, it can be configured with a file system or a database. Meanwhile, as described above, the link keys can also be held in the managing unit 103.

The application communication unit 101 establishes a connection with the application 300 via a communication link 61 that is connected to the application 300, and performs communication with the application 300. The application communication unit 101 receives, for example, the following requests from the application 300: a cryptographic communication start request (an application key provision start request); a cryptographic communication end request (an application key provision end request); and an application key acquisition request. Then, in response to the request received from the application 300, the application communication unit 101 obtains the application key from the managing unit 103 and provides it to the application 300. After that, the key that has been provided to the application 300 can be deleted from the managing unit 103.

The control unit 102 controls the constituent elements that implement the functions of the node 100; and performs a sequence of application key sharing operations in the key sharing network. For example, the control unit 102 instructs (controls) the sharing operation unit 106 to share an application key. Meanwhile, the control unit 102 can perform settings or issue operation instructions with respect to the constituent elements according to an instruction received via the server communication unit 105.

The platform unit 104 provides operating system functionality, basic network functionality, and security functionality of a computer that are necessary for management and operations of the other constituent elements in the node 100.

The server communication unit 105 performs communication with the monitoring server 200 that is present in the management network 51 and that is connected to the server communication unit 105 via a link 62. The server communication unit 105 periodically notifies the monitoring server 200 about a variety of information that is used during monitoring. Herein, the information used during monitoring contains the following information: information related to the connection mode (the topology) with the other nodes 100 that are managed by the node communication unit 107; information that is managed by the node communication unit 107 (or the managing unit 103) related to the quantity and the sharing speed of the link keys that are being shared in each link; and information that is related to a routing table and that is managed by the platform unit 104 or the node communication unit 107; and information that is related to the sharing destination nodes of application keys and the quantity and the sharing speed of the application keys and that is managed by the sharing operation unit 106 and the managing unit 103.

In the case when the platform unit 104 detects an unauthorized access to the computer (of the node 100) or detects a failure of that computer, or in the case when the managing unit 103 detects a risk of an unauthorized access to keys or detects a risk of data leakage of keys; the server communication unit 105 notifies the monitoring server 200 about the detection result.

On the other hand, the server communication unit 105 can receive an instruction from the monitoring server 200 (using the function of the control unit 102) and change the status of the node 100. For example, if the monitoring server 200 issues an instruction to destroy a link key, an instruction to discontinue (disconnect) the node interface or to establish a connection (reconnect) with the node interface, or an instruction to update the routing table; then the server communication unit 105 instructs the node communication unit 107 (using the control unit 102) to perform operations according to the received instruction. Moreover, if an instruction to destroy an application key is received from the monitoring server 200, then the server communication unit 105 instructs the managing unit 103 or the sharing operation unit 106 (using the control unit 102) to perform operations according to the received instruction.

Given above was the explanation regarding a configuration example of the node 100 according to the first embodiment. However, that explanation is only exemplary.

Figure 3:
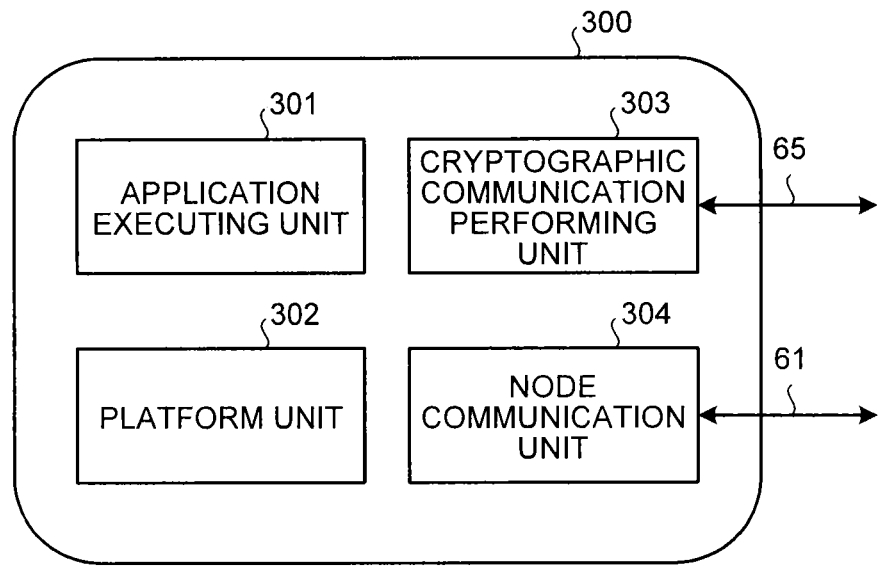
FIG. 3 is a block diagram illustrating an application according to the first embodiment.

Given below is the explanation regarding the application 300 according to the first embodiment. FIG. 3 is a block diagram illustrating a configuration example of the application 300 according to the first embodiment. The application 300 includes a node communication unit 304, a cryptographic communication performing unit 303, an application executing unit 301, and a platform unit 302.

The node communication unit 304 establishes a connection with the node 100 (more particularly, with the application communication unit 101 of the node 100) via the communication link 61 that is connected to the node 100, and performs communication with the node 100. Herein, from the node 100, the node communication unit 304 obtains an application key that is required during cryptographic communication. Before starting to obtain an application key, the node communication unit 304 sends an application key acquisition request to the node 100. Moreover, after obtaining an application key, the node communication unit 304 sends an end request to the node 100. Then, the node communication unit 304 holds and manages the application key that is obtained. The application key that is held is used by the cryptographic communication performing unit 303. For that, upon receiving a request for the application key from the cryptographic communication performing unit 303, the node communication unit 304 provides the application key that is held therein to the cryptographic communication performing unit 303.

The application executing unit 301 implements an application function for performing cryptographic communication. As long as communication is possible, there is no particular restriction on the type of the application function. For example, the application executing unit 301 implements an application function for performing video transmission. Meanwhile, during cryptographic communication, the application executing unit 301 sends and receives data using the cryptographic communication performing unit 303.

The cryptographic communication performing unit 303 provides a communication function, a communication data encryption function, and a communication data decryption function that are required for the operations of the application executing unit 301. The cryptographic communication performing unit 303 receives transmit data from the application 300 and encrypts the transmit data. Then, the cryptographic communication performing unit 303 sends the encryption data to the application network 53 via an encryption data communication link 65. Moreover, the cryptographic communication performing unit 303 receives data via the encryption data communication link 65 through the application network 53; decrypts the received data; and sends the decrypted data to the application executing unit 301. When a new application key is required for encryption and decryption, the cryptographic communication performing unit 303 obtains the new application key from the node communication unit 304.

In the first embodiment, there is no particular restriction on the authentication algorithm and the encryption algorithm implemented by the cryptographic communication performing unit 303. Thus, a Vernam cipher such as the one-time pad (OTP) can be used, or a block cipher such as the advanced encryption standard (AES) can be used. Moreover, apart from the encryption function, the cryptographic communication performing unit 303 can also implement a data authentication function and a communications partner authentication function.

The platform unit 302 provides operating system functionality, basic network functionality, and security functionality of a computer that are necessary for management and operations of the other constituent elements in the application 300.

Given above was the explanation regarding a configuration example of the application 300 according to the first embodiment. However, that explanation is only exemplary.

Figure 4:
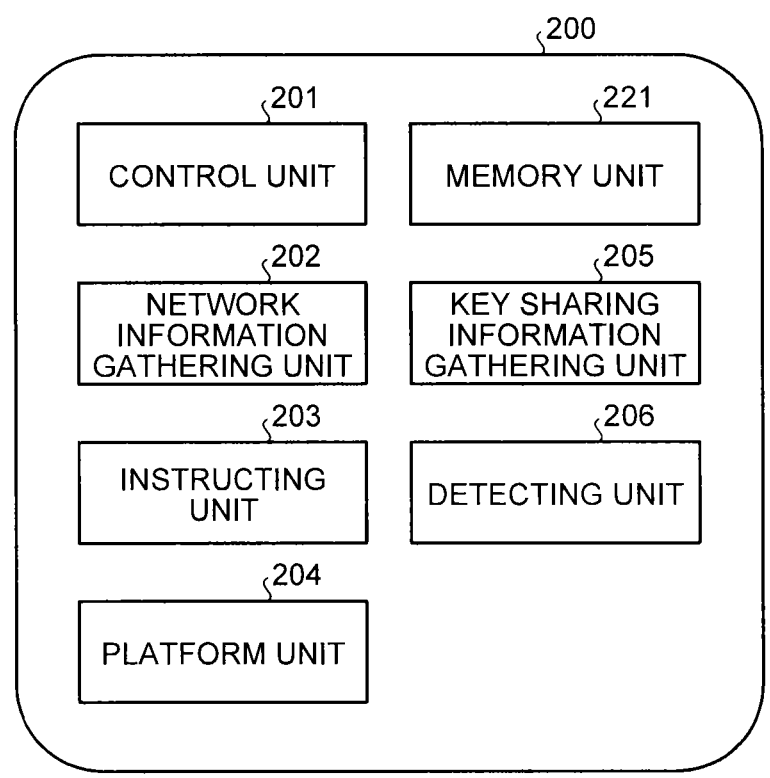
FIG. 4 is a block diagram illustrating a monitoring server according to the first embodiment.

Given below is the explanation regarding the monitoring server 200 according to the first embodiment. FIG. 4 is a block diagram illustrating a configuration example of the monitoring server 200 according to the first embodiment. The monitoring server 200 includes a network information gathering unit 202, a key sharing information gathering unit 205, a memory unit 221, a detecting unit 206, an instructing unit 203, a control unit 201, and a platform unit 204.

The network information gathering unit 202 gathers information related to the relations of connection of the node 100 from the server communication unit 105 of that node 100. For example, the network information gathering unit 202 gathers information (connection information) related to the manner in which the node 100 is link-connected to the other nodes 100 and/or gathers information (routing information) regarding the routing table in the node 100. The gathered information is then stored in, for example, the memory unit 221.

Herein, for example, the network information gathering unit 202 gathers information regarding a periodic basis. As far as the communication method during information gathering is concerned, either the nodes 100 can notify the monitoring server 200 about the information or the monitoring server 200 can send inquiries to the nodes 100 about the information. For example, if the server communication unit 105 of the node 100 is capable of holding or providing the information in the form of management information base (MIB) data; then the network information gathering unit 202 obtains the information by means of simple network management protocol (SNMP) communication.

The key sharing information gathering unit 205 gathers, from the server communication unit 105 of the node 100, information related to the sharing status of link keys and the sharing status of application keys in that node 100. For example, the key sharing information gathering unit 205 gathers information about the link key quantity and the sharing speed of each link key in that node 100 as well as gathers information about the application key quantity and the sharing speed of each application key in that node 100. The gathered information is then stored in, for example, the memory unit 221.

Herein, for example, the key sharing information gathering unit 205 gathers information regarding a periodic basis. As far as the communication method during information gathering is concerned, either the nodes 100 can notify the monitoring server 200 about the information or the monitoring server 200 can send inquiries to the nodes 100 about the information. For example, if the server communication unit 105 of the node 100 is capable of holding or providing the information in the form of MIB data; then the key sharing information gathering unit 205 obtains the information by means of SNMP communication. Alternatively, when the keys in the node 100 increase or decrease by a certain amount; the node can notify the monitoring server 200 about the information (on a non-periodic basis). Meanwhile, the key sharing information gathering unit 205 and the network information gathering unit 202 can be configured to be a single component, so that the information required by both units can be obtained simultaneously by performing communication with the node 100 only once.

The detecting unit 206 detects the node 100 that has been subject to attack. For example, the detecting unit 206 detects an attack on the node 100 from the server communication unit 105 and the platform unit 104 of that node 100. As far as the detection method is concerned, it is possible to implement a method of receiving a notification from the node 100 about attack detection (SNMP trap notification being an example) or it is possible to implement a method (what is called a heartbeat method) in which the detecting unit 206 performs communication with the server communication unit 105 of the node 100 at regular intervals for confirming the soundness of the node 100, and in which discontinuity in the communication leads to the detection of malfunctioning of the node 100, such as a nonworking state of the node 100, by the monitoring server 200.

Alternatively, an attack on the node 100 may not be detected from the communication performed with that node 100. That is, for example, the configuration can be such that, from the sensor device 400 that is present in the monitoring network 54 to which the nodes 100 are separately connected, the detecting unit 206 receives a notification about the occurrence of an attack on a particular node (a physical attack detected by means of sensor malfunctioning) and detects that the particular node 100 has been subject to attack.

Meanwhile, the monitoring server 200 periodically receives sensor values from the sensor device 400. Hence, it is also possible to implement a method in which, if the detecting unit 206 detects abnormality in a sensor value, then it identifies that the corresponding node 100 has been attacked. The information related to the correspondence relationship between the nodes 100 and the sensor device 400 can be statically held in, for example, the memory unit 221. Moreover, the data received from the sensor device 400 can explicitly contain information about the corresponding nodes.

In the case of receiving information indicating attack detection from the nodes 100 or from the sensor device 400, that information can also contain information indicating which node 100 was attacked in what manner. Herein, the information indicating the manner of attack contains, for example, the following information: whether there is a risk of corruption or data leakage in the entire memory/disk; whether there is a risk of corruption or data leakage in only the memory/disk that holds the link keys shared with a particular node 100; and whether there is a risk of corruption or data leakage in only the memory/disk that holds all application keys without any risk to the link keys. The information indicating attack detection can also contain information that enables identification of the data types that are at the risk of corruption/data leakage due to the attack.

Meanwhile, as described above, all such information is held in the managing unit 103 or the node communication unit 107 of the node 100. Physically, such information is stored in a storage device (a memory device) such as a memory or a disk that is connected to the node 100. The storage device can differ depending on the type of keys or depending on the type of nodes in a sharing relationship. The information related to a detected attack (i.e., the information indicating the node that was attacked and the portion of that node 100 which was attacked (i.e., the type of data that was attacked)) is stored in, for example, the memory unit 221.

The memory unit 221 stores therein the information that is received from the network information gathering unit 202, the key sharing information gathering unit 205, and the detecting unit 206. Depending on the information held in the memory unit 221, it becomes possible to understand all relations of connection of the nodes 100 that constitute the key sharing network 52; the sharing information of the link keys in all links; and the sharing information of the application keys in all nodes 100. On a display unit (not illustrated) disposed separately in the monitoring server 200, such information (i.e., the connection status of the nodes 100, the sharing information of link keys, and the sharing information of application keys) can be displayed in a visual format along with network map information to the administrator. Apart from that, it is also possible to hold information regarding the relations of connection between the sensor device 400 and the nodes 100 that are monitored for security by the sensor device 400.

The instructing unit 203 issues an instruction to stop the use of key information that is shared with the node 100 which is detected to have been attacked and issues an instruction to start the routing while bypassing the node 100 that is attacked. For example, the instructing unit 203 instructs the nodes 100 to perform operations such as discarding a particular link key, discarding a particular application key, discontinuing or establishing a particular link (a network interface), and rewriting the routing table. Usually, when the detecting unit 206 detects an attack, the instructing unit 203 instructs the nodes 100 that are present in the key sharing network 52 to perform the abovementioned operations with the aim of avoiding the use of link keys and application keys that are suspected to be corrupted or leaked due to an attack and with the aim of avoiding relay and transfer of application keys via the node 100 that is suspected to be accessed in an unauthorized manner or is suspected of have been rewritten.

The control unit 201 controls the constituent elements that implement the functions of the monitoring server 200; and monitors the key sharing network 52 as well as monitors the nodes 100 and the sensor device 400 that constitute the key sharing network 52. The control unit 201 decides on the measures to be taken for implementing system operations that enable avoiding attacks on the nodes 100, and issues instructions to the nodes 100. For that, the control unit 201 can refer to the network information stored in the memory unit 221, the key sharing information stored in the memory unit 221, and the information that is related to the attacks detected by the detecting unit 206 and that is stored in the memory unit 221.

The platform unit 204 provides operating system functionality, basic network functionality, and security functionality of a computer that are necessary for management and operations of the other constituent elements in the monitoring server 200.

Figure 5:
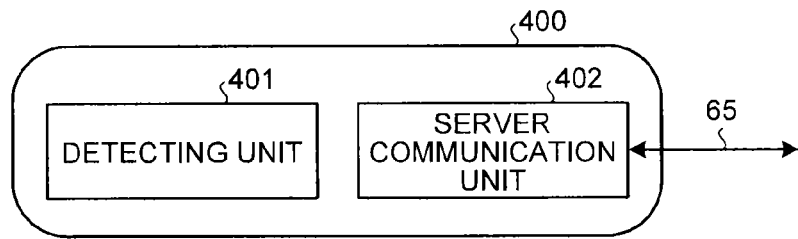
FIG. 5 is a block diagram illustrating a sensor device according to the first embodiment.

Given below is the explanation regarding the sensor device 400 according to the first embodiment. FIG. 5 is a block diagram illustrating a configuration example of the sensor device 400 according to the first embodiment. Herein, the sensor device 400 includes a detecting unit 401 and a server communication unit 402.

The detecting unit 401 is equipped with the functions of sensors (such as a camera, a temperature sensor, a vibration sensor, and a door open/close sensor). The detecting unit 401 monitors the sensor values and detects attacks on the nodes 100 and detects the occurrences of risk to the security. In general, the detecting unit 401 monitors the physical security. Meanwhile, each individual sensor device 400 can be set, in advance, to monitor the security of a particular single node 100. Alternatively, a single sensor device 400 can be configured to simultaneously monitor a plurality of nodes 100.

The server communication unit 402 performs communication with the monitoring server 200, which is present in the management network 51 and which is connected by the link 65, and notifies the monitoring server 200 about the information obtained by the detecting unit 401. As far as the communication method is concerned, it is possible to implement a method of notifying the monitoring server 200 about the occurrence of an attack (SNMP trap notification being an example) or it is possible to implement a method of periodically notifying the monitoring server 200 about the sensor data that is periodically obtained by the detecting unit 401. Alternatively, it is also possible to implement a method in which the monitoring server 200 periodically sends an inquiry and the server communication unit 402 responds to the inquiry with the sensor data and the presence or absence of any attack. Meanwhile, the correspondence relationship between the sensor device 400 and the nodes 100 that are monitored for security by the sensor device 400 can be managed in the monitoring server 200. Alternatively, at the time of performing communication with the monitoring server 200, the sensor device 400 can clearly specify the correspondence relationship including the information about the corresponding nodes 100 to the monitoring server 20C. Particularly, in the case when the sensor device 400 monitors the security of a plurality of nodes 100, it is necessary to clearly specify during the communication about the node 100 that is subject to attack.

Meanwhile, the constituent elements of the nodes 100, the monitoring server 200, the applications 300, and the sensor device 400 can be implemented by running computer programs in a processing unit such as a CPU, that is, can be implemented using software; or can be implemented using hardware such as an integrated circuit (IC); or can be implemented using a combination of software and hardware. Moreover, the memory unit 221 and the managing unit 103 can be configured using any of the commonly-used memory medium such as a hard disk drive (HDD), an optical disk, a memory card, or a random access memory (RAM).

Figure 6:
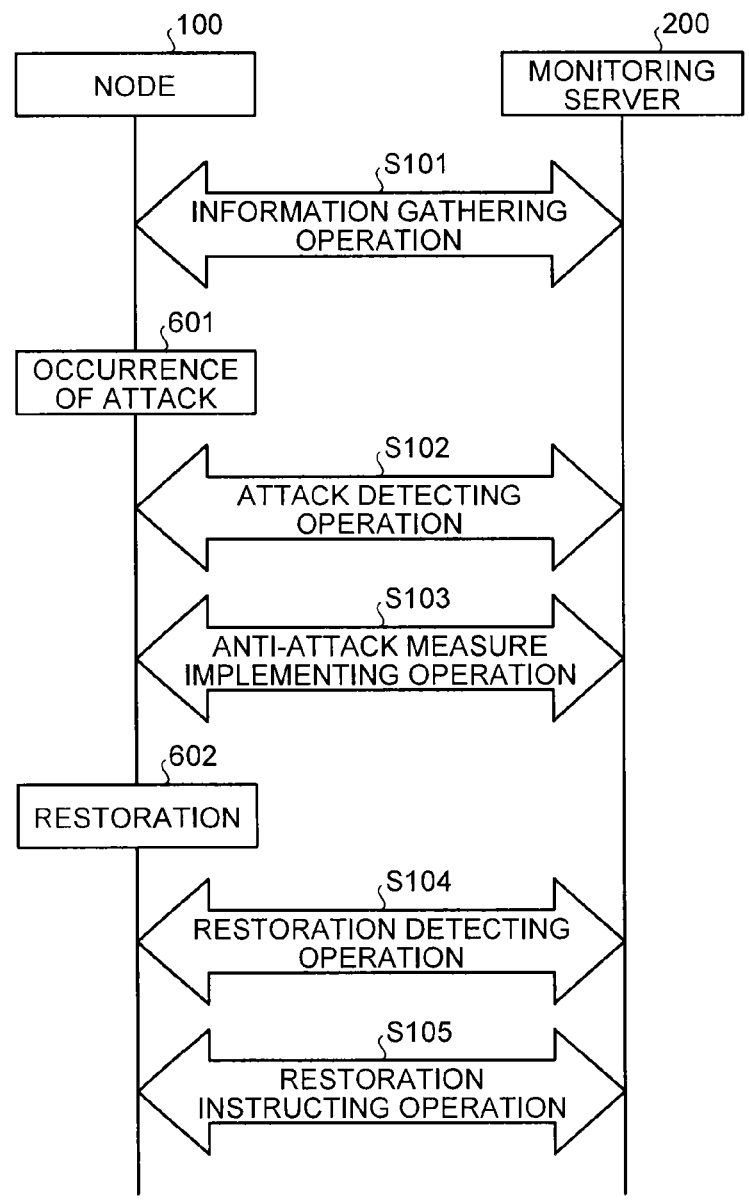
FIG. 6 is a sequence diagram illustrating operations according to the first embodiment.

Given below is the explanation of a sequence of operations according to the first embodiment. FIG. 6 is a sequence diagram illustrating an example of the operations according to the first embodiment. Herein, it is illustrated that the communication is performed between a single node and the monitoring server 200. However, in practice, there is a plurality of nodes 100 present in the key sharing network 52. Thus, the monitoring server 200 can perform communication all of those nodes 100. Moreover, although not illustrated in FIG. 6, the sensor device 400 also performs communication with the monitoring server 200.

As illustrated in FIG. 6, the sequence of operations according to the first embodiment includes an information gathering operation (Step S101), an attack detecting operation (Step S102), an anti-attack measure implementing operation (Step S103), a restoration detecting operation (Step S104), and a restoration instructing operation (Step S105). Explained below are the details of each operation.

Step S101: Information Gathering Operation

Herein, the explanation is given about an information gathering operation in a steady state in which there is no occurrence of attack. The node 100 present in the key sharing network 52 is sharing link keys as well as sharing application keys for the purpose of performing cryptographic data communication of applications. In order for the node 100 to share an application key with another node 100 (partner node) that is not directly connected via a link, the application needs to be transferred and relayed using still different nodes 100. Generally, there can be a plurality of routes (lists of the nodes 100 in the routes) for transferring and sharing an application key from a particular node 100 to the partner node. It is assumed that such routes are determined according to the routing protocol implemented in the key sharing network 52 or according to the routing protocols set in advance in the individual nodes 100.

The monitoring server 200 that is present in the management network 51 gathers, from each node 100, the connection status of that node 100, the sharing information of link keys, and the sharing information of application keys. Herein, the monitoring server 200 gathers the information regarding a continuous basis and is always holding the latest information.

Step S102: Attack Detecting Operation

When the node 100 is subject to an attack (occurrence of attack 601), the detecting unit 206 of the monitoring server 200 detects the occurrence of that attack. As far as the detection method is concerned, various patterns such as patterns A to D described below can be implemented.

A. When the node 100 is subject to an attack (such as an unauthorized access), the node 100 sends a trap notification and directly notifies the monitoring server 200 about the occurrence of the attack.

B. The monitoring server 200 periodically monitors the node 100. Thus, the monitoring server 200 detects an error (such as abnormality in values or difficulty in communication) in the information obtained from the node 100 and determines that the node 100 has been attacked (i.e., implements what is called the heartbeat method).

C. The sensor device 400 that is present in the monitoring network 54 and that monitors the security of the nodes 100 detects malfunctioning of the node 100 and sends a trap notification for notifying the monitoring server 200 about the occurrence of an attack.

D. The sensor device 400 periodically notifies the monitoring server 200 about the values obtained by the sensors. Accordingly, the monitoring server 200 detects malfunctioning (such as abnormality in values or difficulty in communication) and determines that the node 100 has been attacked.

Step S103: Anti-Attack Measure Implementing Operation

The instructing unit 203 of the monitoring server 200 that has detected an attack on the node 100 instructs the group of nodes to perform system operations (take measures) while avoiding the node 100 that has been attacked as well as avoiding the link keys and the application keys that are suspected to be leaked.

The measures can be broadly divided into two.

A. When there is a risk of leakage of keys that are held in a particular memory or a particular disk; then it is likely that the keys held therein are not secure. For that reason, an instruction for destroying such keys is issued to the nodes 100 that are sharing the keys held in that memory or that disk.

B. In an entire node, if an attack related to hacking or physical security is detected, then it is likely that the entire node 100 is not secure. For that reason, after that, the application keys routed through that node 100 are not used. That is, routing is performed in such a way that the application keys avoiding the attacked node 100 are shared.

Herein, it is possible either to implement both the measures or to implement either one of the two measures. Typically, both the measures are implemented at the same time.

Explained below is a concrete method for instructing the abovementioned measures to the node 100. Firstly, in the case of instructing the node 100 to destroy the keys likely to be not secure (the measure A described above); the control unit 201 of the monitoring server 200 refers to attacked-node related information that is stored in the memory unit 221, refers to the information regarding the relations of connection, and refers to the information regarding the sharing relationship of application keys; and identifies the nodes 100 that share link keys with the attacked node 100 as well as identifies the nodes 100 that share application keys with the attacked node 100 (i.e., functions as an identifying unit). Moreover, if the information regarding the attack indicates that only a particular key is suspected to be not secure; then, from among the identified nodes 100, the control unit 201 further selects only the nodes 100 that are actually sharing the key that is suspected to be not secure. Then, according to an instruction from the control unit 201, the instructing unit 203 instructs (communicates) the identified nodes 100 to destroy (or to stop using) the keys (link keys or application keys) being shared with the attacked node 100.

Moreover, in order to clearly specify the keys that are to be destroyed, the instructing unit 203 can issue an instruction including ID information of the application keys and ID information of the link keys to the nodes 100. In order to implement that, during the information gathering operation for gathering the sharing information of the link keys and the application keys, the monitoring server 200 also needs to gather the ID information of the application keys and the link keys.

During the attack detecting operation too, it is desirable to notify the monitoring server 200 about the information related to the range of IDs of the application keys and the link keys that are suspected to be not secure. With that, while instructing to destroy the application keys and the link keys, the monitoring server 200 can also specify the range of IDs of those keys. However, even in the case when, due to a detected attack, the monitoring server 200 cannot obtain the information regarding the range of IDs of the application keys and the link keys that are suspected to be not secure; the monitoring server 200 can specify the IDs of the latest application keys and the latest link keys that were gathered during the information gathering operation, and can instruct to destroy all older keys.

As far as the method of stopping using the application keys and the link keys, it is possible to immediately delete the information regarding those keys or it is possible to temporarily setting the keys to an "unusable" state.

Moreover, the instructing unit 203 can also instruct the nodes 100 not to allow subsequent sharing of those application keys and link keys.

In the case of performing routing to avoid the node 100 that is likely to be not secure (the measure B described above), the control unit 201 of the monitoring server 200 refers to the information stored in the memory unit 221 regarding the attacked node 100 and refers to the information regarding the relations of connection, and identifies the nodes 100 that are link-connected to the attacked node 100. Then, the instructing unit 203 instructs the identified nodes 100 to discontinue the links (network interfaces) connected to the attacked node 100. After the network is discontinued, the application keys are shared via new routes. This can be automatically performed according to the routing protocol implemented in the key sharing network 52. Moreover, the monitoring server 200 can calculate suitable routes by referring to the connection information of the nodes 100 that is held in the memory unit 221, and can instruct each node 100 to set a new routing table.

Step S104: Restoration Detecting Operation

In the case when an attacked node 100 returns to (is restored to) the secure state (restoration 602), the detecting unit 206 of the monitoring server 200 detects the restoration.

In an identical manner to the detection of an attack, the detection of the fact that the attacked node 100 has returned to the secure state can be performed based on the detection of sensor values or based on a notification from that node 100 (the patterns A to D described above). In the case of implementing what is called the heartbeat method; if the node 100 responds in a correct manner, the detecting unit 206 can determine that the restoration is complete. Alternatively, it is often the case that the administrator checks the node 100, performs manual restoration, and confirms the restoration. In that case, when the administrator inputs to the monitoring server 200 that the attacked node 100 has returned to the secure state, the detecting unit 206 can detect the input and thus detect the restoration.

Step S105: Restoration Instructing Operation

The instructing unit 203 issues an instruction to revert (cancel) the anti-attack measures implemented in the anti-attack measure implementing operation at Step S103. For example, with respect to the nodes 100 which have been disallowed to share the application keys and the link keys, the instructing unit 203 issues an instruction that allows sharing. Moreover, if the result of restoration makes it clear that the keys are secure (were not leaked), then the instructing unit 203 can issue an instruction to reset the keys that were temporarily set to the "unusable (disused)" state to a "usable" state. In the case when the IDs are assigned as sequential numbers, it can happen that the key assigned with a subsequent number (ID) than the ID of the key in disuse is generated and used. In such a case, the instructing unit 203 can instruct changes in the IDs assigned to the application keys and the link keys. Moreover, with respect to the node 100 that was instructed to discontinue the link, the instructing unit 203 instructs reestablishing the link (the network interface) of that node 100.

Regarding the routing of application keys, the monitoring server 200 can calculate suitable post-restoration routes by referring to the connection information of the nodes 100 that is held in the memory unit 221, and then instruct each node 100 to set a new routing table. Alternatively, without performing any operations in particular, the operations can be left to the automatic setting of the routing protocol that is implemented in the key sharing network 52. In that case too, at the restoration timing, the monitoring server 200 can instruct the nodes 100 to perform route recalculation of the routing protocol.

Modification Example

Meanwhile, the functions of the monitoring server 200 can also be implemented in an integrated manner with a particular node 100 in the key sharing network 52.

In this way, in the communication system according to the first embodiment, with respect to the group of nodes that are sharing key information with a node which has been attacked, the monitoring server issues an instruction to stop using (to destroy or to disuse) the shared key information or to start routing in which the attacked node is avoided. With that, even if a particular node is subject to attack, the application key sharing function can be maintained in a secure manner throughout the entire communication system.

Second Embodiment

In a communication system according to a second embodiment, the functions of the monitoring server are implemented in a dispersed manner among all the nodes present in the key sharing network 52. The communication system according to the second embodiment has a configuration that does not include the monitoring server 200, the sensor device 400, the management network 51, and the monitoring network 54.

Figure 7:
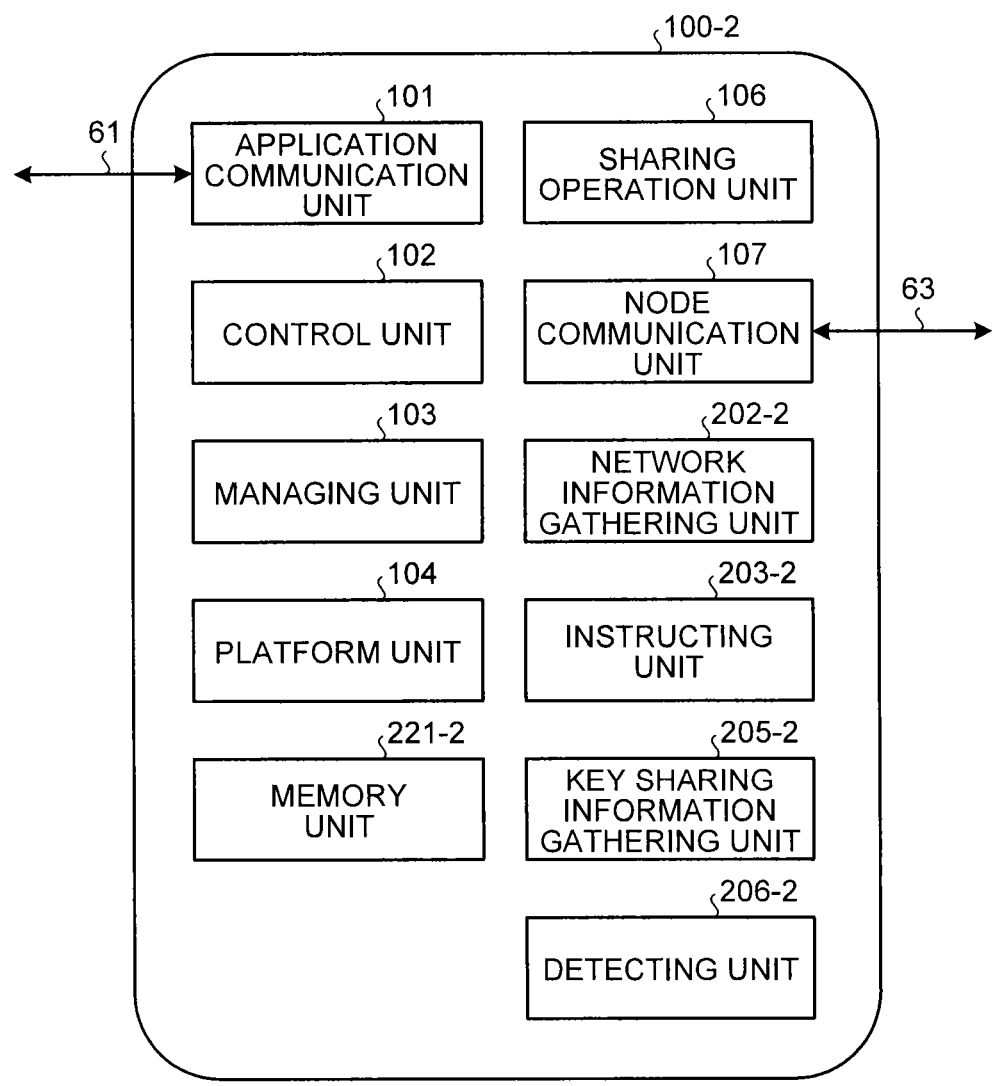
FIG. 7 is a block diagram illustrating a node according to a second embodiment.

FIG. 7 is a block diagram illustrating an exemplary configuration of a node 100-2 according to the second embodiment. As illustrated in FIG. 7, the node 100-2 includes the node communication unit 107, the sharing operation unit 106, the managing unit 103, the application communication unit 101, the control unit 102, the platform unit 104, a network information gathering unit 202-2, a key sharing information gathering unit 205-2, a memory unit 221-2, a detecting unit 206-2, and an instructing unit 203-2.

As compared to the first embodiment, the second embodiment differs in the way that the server communication unit 105 is not disposed, while the network information gathering unit 202-2, the key sharing information gathering unit 205-2, the memory unit 221-2, the detecting unit 206-2, and the instructing unit 203-2 are additionally disposed. Apart from that, the remaining constituent elements and the functions are identical to FIG. 2 that is the block diagram of the node 100 according to the first embodiment. Hence, the same constituent elements are referred to by the same reference numerals and the explanation thereof is not repeated.

The network information gathering unit 202-2 gathers information related to the relations of connection of the corresponding node 100-2 from the server communicating unit 105 of the other nodes 100-2. As far as the method of information gathering is concerned, it is possible to implement the same method as implemented by the network information gathering unit 202 according to the first embodiment.

The key sharing information gathering unit 205-2 gathers the information related to the sharing status of the link keys and the application keys in the corresponding node 100-2 from the server communication unit 105 of the other nodes 100-2. As far as the method of information gathering is concerned, it is possible to implement the same method as implemented by the key sharing information gathering unit 205 according to the first embodiment. Moreover, the range of gathering the key sharing information can be limited only up to the partner nodes that are sharing the link keys with the corresponding node and to the partner nodes that are sharing the application keys with the corresponding node. In that case, since the sharing information of the link keys and the application keys is held in the node communication unit 107 and the managing unit 103, the key sharing information gathering unit 205-2 can obtain the information from the node communication unit 107 and the managing unit 103 without having to perform any special communication.

The detecting unit 206-2 detects the node 100-2 that has been attacked. For example, the detecting unit 206-2 implements the heartbeat method and detects that another node 100-2 has been attacked. Alternatively, the detecting unit 206-2 receives a notification from another node 100-2 that has been attacked, and detects that the other node 100-2 has been attacked. Meanwhile, the range of nodes for detecting an attack can be limited only to the partner nodes that are sharing the link keys with the corresponding node and to the partner nodes that are sharing the application keys with the corresponding node, as well as limited only to the nodes that are directly connected to the corresponding node by internode links.

The memory unit 221-2 stores therein the information that is received from the network information gathering unit 202-2, the key sharing information gathering unit 205-2, and the detecting unit 206-2.

The instructing unit 203-2 issues an instruction to stop using the key information that is being shared with the node 100-2 which is detected to have been attacked. For example, the instructing unit 203-2 instructs the sharing operation unit 106 to stop using the application keys and the link keys that are shared with the node 100-2 which is detected to have been attacked.

Given below is the explanation of a sequence of operations according to the second embodiment. In the second embodiment, the sequence of operations according to the first embodiment (FIG. 6) is changed in the following manner.

Step S101: Information Gathering Operation

The node 100-2 present in the key sharing network 52 gathers the node connection status of all other nodes 100-2. Moreover, the link key sharing information and the application key sharing information of the other nodes 100-2 (all of the nodes 100-2 or some of the nodes 100-2) is gathered (by the network information gathering unit 202-2 and the key sharing information gathering unit 205-2).

Step S102: Attack Detecting Operation

When the detecting unit 206-2 detects an attack on either the corresponding node or the neighboring node 100-2 (by means of the heartbeat method); it sends a notification about the detection of an attack to all of the nodes 100-2, or to the nodes 100-2 that are directly connected by internode links, or to the nodes 100-2 that share the link keys or the application keys. In the case of implementing a plurality of detection methods, an attack may get detected in a duplicative manner. In such a case, one of those detections can be ignored.

Step S103: Anti-Attack Measure Implementing Operation

As long as the instructing unit 203-2 of each node 100-2 instructs to discontinue the corresponding link (network interface) and instructs to destroy the application keys and the link keys held therein, it serves the purpose. Thus, none of the nodes 100-2 need to instruct any measures to the other nodes 100-2.

Step S104: Restoration Detecting Operation

In the case when an attacked node 100-2 is restored; it sends a notification about the restoration to all other nodes 100-2, or to the nodes 100-2 that are directly connected by internode links, or to the nodes 100-2 that share the link keys or the application keys.

Step S105: Restoration Instructing Operation

As long as the instructing unit 203-2 of each node 100-2 issues instructions to establish the corresponding link (network interface) and to lift a ban on key sharing, it serves the purpose. Thus, none of the nodes 100-2 need to instruct any measures to the other nodes 100-2.

In this way, in the communication device according to the second embodiment; even in the case when the communication system is configured not to include a monitoring server, it becomes possible to implement the same functions as the functions according to the first embodiment.

As described above, according to the first and second embodiments; even if a particular node is subject to attack, the application key sharing function can be maintained in a secure manner throughout the entire communication system.

Figure 8:
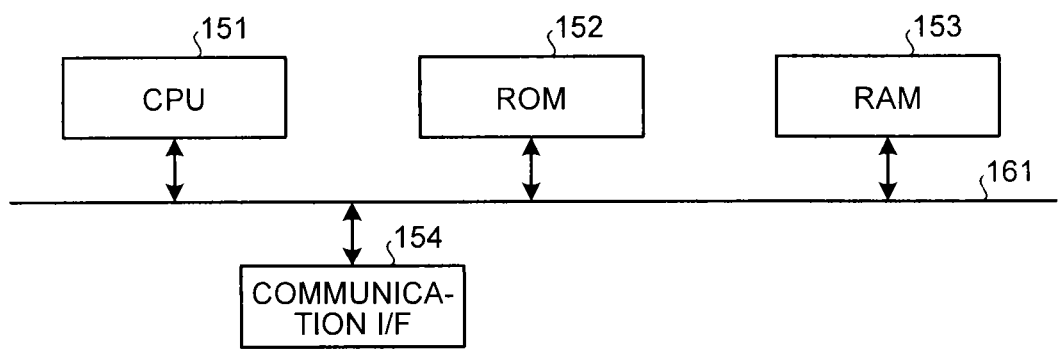
FIG. 8 is a hardware configuration diagram of devices according to the embodiments.

Explained below with reference to FIG. 8 is a hardware configuration of devices (a monitoring server and a node) according to the first and second embodiments. FIG. 8 is an explanatory diagram for explaining a hardware configuration of devices according to the first and second embodiments.

Each of the devices according to the first and second embodiments includes a control device such as a central processing unit (CPU) 151; memory devices such as a read only memory (ROM) 152 and a random access memory (RAM) 153; a communication I/F 154 that performs communication by establishing a connection with a network; and a bus 161 that interconnects the other constituent elements.

Meanwhile, the computer programs that are executed in the devices according to the first and second embodiments are stored in advance in the ROM 152.

Alternatively, the computer programs that are executed in the devices according to the first and second embodiments can be recorded in the form of installable or executable files in a computer-readable recording medium such as a compact disk read only memory (CD-ROM), a flexible disk (FD), a compact disk readable (CD-R), or a digital versatile disk (DVD); and can be provided as a computer program product.

Still alternatively, the computer programs that are executed in the devices according to the first and second embodiments can be saved as downloadable files on a computer connected to the Internet or can be made available for distribution through a network such as the Internet.

Meanwhile, the computer programs that are executed in the devices according to the first and second embodiments can make a computer function as the constituent elements of the abovementioned communication device. In that computer, the CPU 151 reads the computer programs from a computer-readable memory medium and runs them such that the computer programs are loaded in a main memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device that is connected to a plurality of external devices sharing key information, the communication device comprising:
   a sharing operation unit configured to continue to share the key information with one or more of the plurality of external devices using quantum key distribution technology;
   a key storage memory configured to differently store the shared key information depending on one of the type of key information and the one or more of the plurality of external devices participating in the sharing;
   a detector configured to, from among the one or more of the plurality of external devices, detect an external device that has been subject to attack; and
   responsive to determining the detected external device is subject to attack, an instructing unit configured to issue an instruction to stop using the shared key information which is stored by the key storage memory and shared with the detected external device, wherein the instructing unit further issues an instruction to stop the sharing operation unit from sharing the shared key information with the detected external device, and further issues an instruction to set to an unusable state the shared key information that is stored by the key storage memory and shared with the detected external device, wherein responsive to determining the attacked external device has been restored to a secure status, the instructing unit further issues an instruction to restart the sharing operation to share the shared key information with the restored external device and further issues an instruction to set the shared key information that is shared with the restored external device and stored by the key storage memory to a usable state and resume using the shared key information.

2. The device according to claim 1, wherein the instructing unit further issues an instruction to cut off connection with the detected external device.

3. The device according to claim 2, wherein
the detector further detects restoration of the detected external device from an attacked state, and
when restoration is detected, the instructing unit further issues an instruction to reestablish communication that was discontinued.

4. The device according to claim 1, wherein, based on detection information received from a detecting device which detects malfunctioning of the external devices, the detector detects the external device that has been subject to attack.

5. The device according to claim 1, wherein the detector periodically communicates with the external devices and, as the external device that has been subject to attack, detects the external device with respect to which difficulty is faced during periodic communication.

6. The device according to claim 1, wherein the instructing unit further issues an instruction to set routing information indicating a route not going through the detected external device.

7. The device according to claim 6, wherein
the detector further detects restoration of the detected external device from an attacked state, and
when restoration is detected, the instructing unit further issues an instruction to recalculate routing information.

8. The device according to claim 1, wherein
from among a plurality of memory devices included in the external devices, the detector detects a memory device that has been subject to attack, and
the instructing unit issues an instruction to stop using key information that is shared upon being stored in the detected memory device.

9. The device according to claim 1, further comprising an identifying unit configured to identify other external devices that share key information with the detected external device, wherein
the instructing unit issues an instruction to the other external devices that have been identified to stop using key information shared with the detected external device.

10. The device according to claim 1, wherein
the detector further detects restoration of the detected external device from an attacked state, and
when restoration is detected, the instructing unit further issues an instruction to resume using the key information that was not allowed to be used.

11. The device according to claim 1, wherein the key information contains at least either link keys that are shared among mutually neighboring devices or application keys that are shared among mutually neighboring devices as well as among mutually non-neighboring devices.

12. The device according to claim 11, wherein
the link keys are shared among devices by means of quantum key distribution, and
the application keys are generated as random numbers.

13. A computer program product comprising a non-transitory computer readable medium including a computer program, wherein the program, when executed by a computer that is connected to a plurality of external devices sharing key information, causes the computer to perform:
continuing to share the key information with one or more of the plurality of external devices using quantum key distribution technology;
storing, in a key storage memory, the shared key information differently depending on one of the type of key information and the one or more of the plurality of external devices participating in the sharing;
detecting, from among the one or more of the plurality of external devices, an external device that has been subject to attack; and
responsive to determining the detected external device is subject to attack, issuing an instruction to stop using the shared key information which is stored by the key storage memory and shared with the detected external device, the issuing includes issuing an instruction to stop sharing the shared key information with the detected external device, and issuing an instruction to remove the shared key information that is stored by the key storage memory and shared with the detected external device and further issues an instruction to set to an unusable state the shared key information that is stored by the key storage memory and shared with the detected external device, wherein responsive to determining the attacked external device has been restored to a secure status, issuing an instruction to restart the sharing of the shared key information with the restored external device and further issuing an instruction to set the shared key information that is shared with the restored external device and stored by the key storage memory to a usable state and resume using the shared key information.

* * * * *